June 16, 1931.  G. H. THOMAS  1,810,503
FLOATING REAMER HOLDER
Original Filed Oct. 4, 1926   2 Sheets-Sheet 1
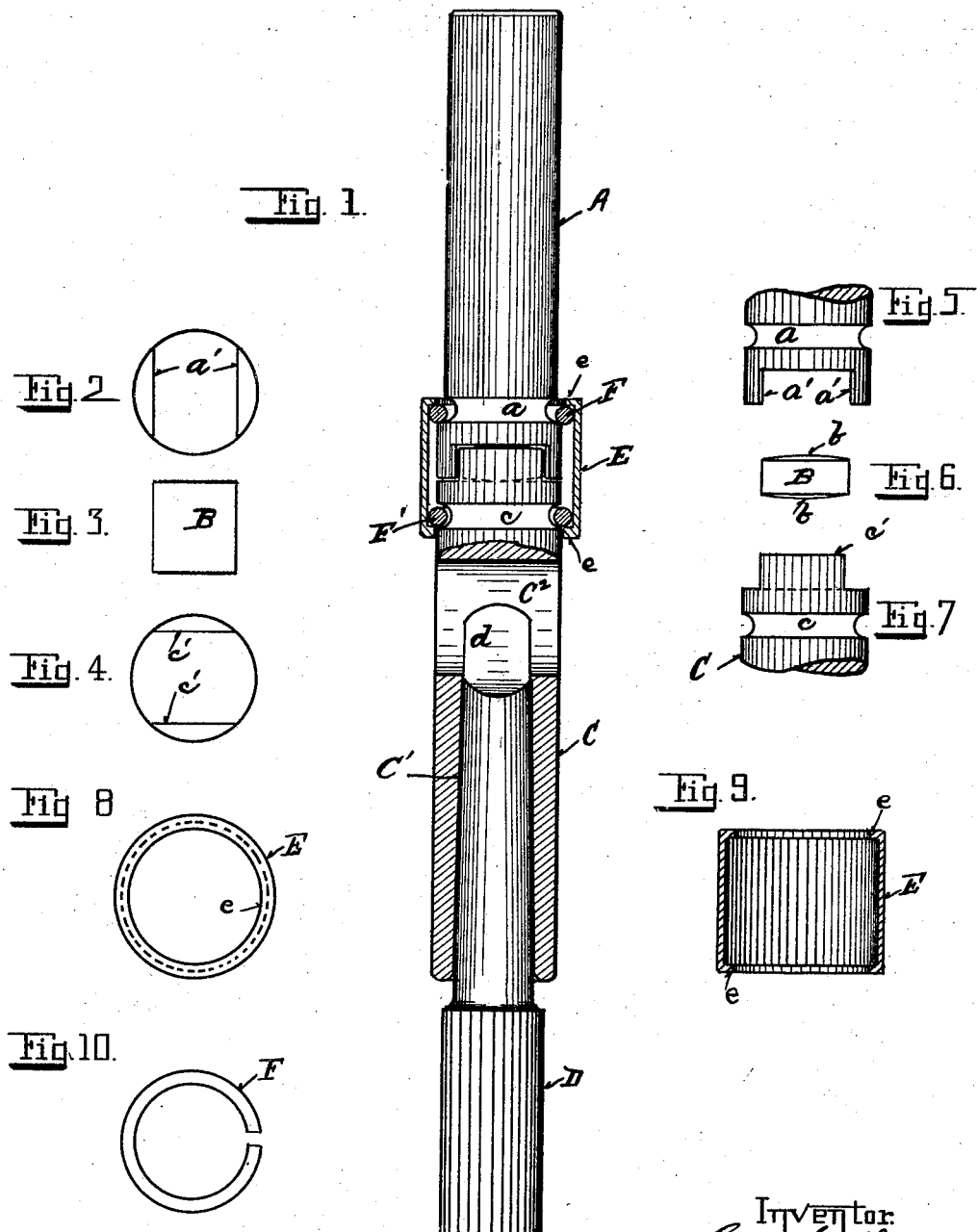

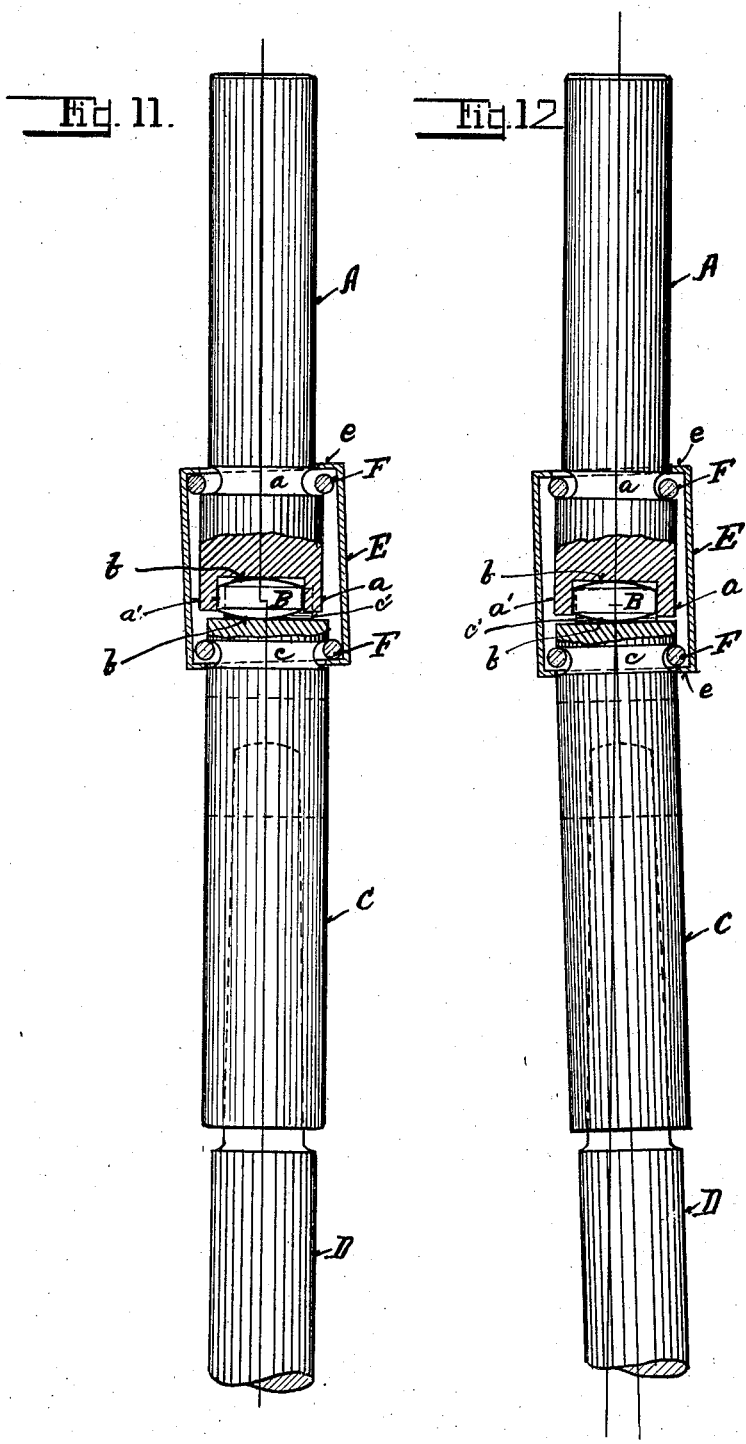

Patented June 16, 1931

1,810,503

UNITED STATES PATENT OFFICE

GEORGE H. THOMAS, OF ERIE, PENNSYLVANIA, ASSIGNOR TO AMERICAN STERILIZER COMPANY, OF ERIE, PENNSYLVANIA, A CORPORATION OF PENNSYLVANIA

FLOATING REAMER HOLDER

Application filed October 4, 1926, Serial No. 139,448. Renewed April 24, 1929.

The object of the invention is to provide a reamer holder with a floating driving connection which will permit the tool to be guided by the hole both as to off-setting and angular mis-alinement. Features and details of the invention will appear from the specification and claims.

A preferred embodiment of the invention is illustrated in the accompanying drawings as follows:—

Fig. 1 shows a side view of the holder, partly in section.

Fig. 2 an end view of the shank.

Fig. 3 a plan view of an intermediate member.

Fig. 4 an end view of the holder, or split member.

Fig. 5 a side elevation of the shank end.

Fig. 6 a side elevation of an intermediate member detached.

Fig. 7 a side elevation of the socket, or holder member.

Fig. 8 a retaining member.

Fig. 9 a sectional view of the retaining member.

Fig. 10 a plan view of a split ring that co-operates with the retaining member.

Fig. 11 a side elevation of the tool, partly in section, showing the members off-set.

Fig. 12 a similar view showing the members in angular mis-alinement.

A marks the shank. This may be of any construction adapting it for attachment to a tool, such as the head of a turret lathe, or the driving head of a drill press. A groove $a$ is arranged adjacent to the lower end of the shank and the shank is transversely slotted providing the driving shoulders $a'$, $a'$, at the sides of the slot.

An intermediate member B is of rectangular form and has spherical thrust faces $b$, $b$. This intermediate member is slidingly mounted in the transverse slot in the end of the shank A between the shoulders $a'$, $a'$.

A socket, or holder member C is provided with a socket C' adapted to receive the shank of a reamer D. The reamer is shown with the usual driving tang $d$ and the socket member with the usual transverse opening C² for receiving the tang and for facilitating the removal of the reamer from the socket.

An annular groove $c$ is arranged around the socket member adjacent to its upper end and it is provided with a transverse slot across its upper end, this slot forming driving shoulders $c'$, $c'$, which shoulders are adapted to slidingly engage the sides of the intermediate member B. The parts are assembled with the slots at the ends of the shank and socket member arranged alternately, or crosswise of each other, and the intermediate member is arranged in the slots and is adapted to slide between the shoulders so as to accommodate any off-setting that may be necessary to permit the reamer to follow the hole. At the same time it maintains, under all conditions, a perfect driving connection between the shank and the socket member. The spherical faces $b$ of the intermediate member engage the thrust faces at the bottoms of the slots in the ends of the shank and socket member. Forming engaging thrust surfaces with point contacts by making some of the surfaces, as the surfaces $b$, $b$ spherical maintains the thrust approximately central even though the socket member may be in angular mis-alinement with the shank as clearly shown in Fig. 12. If these surfaces were formed perfectly flat it will be readily observed that with the tilting of the socket member relatively to the shank, as shown in that figure, the thrust would be transferred to the extreme edge of the intermediate member and would tend to disturb the accurate following of the hole by the reamer.

In order to hold the members in assembly and with such limited play between the members as may be necessary to take care of mis-alinement I provide the following mechanism:

A retaining member E, in the form of a sleeve. is provided with the internal flanges $e$ at its ends. Split rings F, F' are arranged in the annular grooves $a$, $c$, respectively. The sleeve E encloses the rings F, F', and the flanges $e$ engage these rings locking the parts together but permitting a limited movement to allow the necessary flexibility of the socket member relatively to the shank but limiting this movement within a fairly close range so that the tool may be held in proper position to enter the work.

In the operation of the device the shank A, as before stated, is mounted in the tool and may be moved to the work, or rotated, or it may remain stationary and the work moved, or rotated relatively to it in accordance with the common practice. The reamer is forced into the hole, the thrust being communicated through the intermediate member acting on the spherical surfaces and is free to follow the hole even though there be considerable mis-alinement. The retaining members hold the socket member in proper position to direct the tool to the work.

What I claim as new is:—

1. A tool holder comprising a shank member; an intermediate member; a socket member; transverse shoulders forming a transversely sliding driving connection between the shank member and the intermediate member; and transverse shoulders forming a transversely sliding driving connection between the intermediate member and the socket member, said shoulders being alternately arranged, said shank member, intermediate member, and socket member having centrally engaging thrust surfaces, said surfaces gradually receding from each other from the center out and maintaining an approximately central thrust relation through the intermediate member.

2. A holder according to claim 1 in which the transverse shoulders are arranged on the shank and socket member.

3. A holder according to claim 1 in which the intermediate member has convexly curved engaging surfaces.

4. A holder according to claim 1 in which the transverse shoulders are on the shank and socket members and the intermediate member has convexly curved engaging surfaces.

5. A holder according to claim 1, on which there is provided a means maintaining the shank and socket members in flexible connection with each other.

6. A holder according to claim 1 in which the transverse shoulders are arranged on the shank and socket members and means are provided for maintaining said shank and socket members in flexible connection with each other.

7. A holder according to claim 1 in which the transverse shoulders are arranged on the shank and socket members and the intermediate member has convexly curved engaging surfaces and in which means is provided for maintaining the shank and socket members in flexible connection with each other.

In testimony whereof I affix my signature.

GEORGE H. THOMAS.